United States Patent
Christmas et al.

(10) Patent No.: US 12,513,345 B2
(45) Date of Patent: Dec. 30, 2025

(54) SYSTEMS AND METHODS FOR SIMULTANEOUS MULTIPLE POINT OF VIEW VIDEO

(71) Applicant: Fasetto, Inc., Scottsdale, AZ (US)

(72) Inventors: Coy Christmas, Scottsdale, AZ (US); Dave Rich, Scottsdale, AZ (US); Dustin Anderson, Scottsdale, AZ (US)

(73) Assignee: Fasetto, Inc., Scottsdale, AZ (US)

( * ) Notice: Subject to any disclaimer, the term of this patent is extended or adjusted under 35 U.S.C. 154(b) by 0 days.

(21) Appl. No.: 18/268,170

(22) PCT Filed: Dec. 20, 2021

(86) PCT No.: PCT/US2021/064366
§ 371 (c)(1),
(2) Date: Jun. 16, 2023

(87) PCT Pub. No.: WO2022/133346
PCT Pub. Date: Jun. 23, 2022

(65) Prior Publication Data
US 2024/0056615 A1    Feb. 15, 2024

Related U.S. Application Data

(60) Provisional application No. 63/127,419, filed on Dec. 18, 2020.

(51) Int. Cl.
*H04N 21/218*    (2011.01)
*H04L 65/65*    (2022.01)
(Continued)

(52) U.S. Cl.
CPC ....... *H04N 21/21805* (2013.01); *H04L 65/65* (2022.05); *H04N 21/242* (2013.01); *H04N 21/6587* (2013.01); *H04N 21/8547* (2013.01)

(58) Field of Classification Search
CPC .......... H04N 21/21805; H04N 21/242; H04N 21/6587; H04N 21/8547; H04N 21/2665;
(Continued)

(56) References Cited

U.S. PATENT DOCUMENTS

| 8,640,181 B1 * | 1/2014 | Inzerillo ............... H04N 21/242 725/151 |
| 10,033,968 B2 * | 7/2018 | Pineau ............... H04N 21/2187 |

(Continued)

FOREIGN PATENT DOCUMENTS

| KR | 20180119476 A | 11/2018 |
| KR | 20200080095 A | 7/2020 |
| WO | 2018224839 A2 | 12/2018 |

OTHER PUBLICATIONS

Patent Cooperation Treaty, International Search Report and Written Opinion received in application No. PCT/US2021/064366, dated Apr. 27, 2022.

*Primary Examiner* — Alazar Tilahun
(74) *Attorney, Agent, or Firm* — SNELL & WILMER L.L.P.

(57) ABSTRACT

A system for simultaneous multiple point of view video is disclosed. The system may receive a first video stream from a first device, receive a second video stream from a second device, and receive a third video stream from a third device, extract timing data from each of the first video stream, the second video stream, and the third video stream, determine time signatures associated with each of the first video stream, the second video stream, and the third video stream based on the timing data, generate a post-process data based on each of the first video stream, the second video stream, and the third video stream, and align one or more time signatures encoded on the post-process data to generate a production data file comprising a plurality of time synchro- (Continued)

nized video streams corresponding to each of the first video stream, the second video stream, and the third video stream.

20 Claims, 19 Drawing Sheets

(51) Int. Cl.
*H04N 21/242* (2011.01)
*H04N 21/6587* (2011.01)
*H04N 21/8547* (2011.01)

(58) Field of Classification Search
CPC .......... H04N 21/2743; H04N 21/4728; H04N 23/90; H04N 21/43072; H04N 21/44004; H04N 21/44008; H04N 23/69; H04N 5/04; H04L 65/65
See application file for complete search history.

(56) References Cited

U.S. PATENT DOCUMENTS

| | | | |
|---|---|---|---|
| 2013/0188932 A1* | 7/2013 | Hartley | H04N 9/87 |
| | | | 386/282 |
| 2019/0028746 A1 | 1/2019 | Inzerillo | |
| 2020/0162796 A1* | 5/2020 | Azuolas | H04N 21/23106 |
| 2020/0213635 A1 | 7/2020 | Baick et al. | |

\* cited by examiner

SYSTEMS AND METHODS FOR SIMULTANEOUS MULTIPLE POINT OF VIEW VIDEO

CROSS REFERENCE TO RELATED APPLICATIONS

This application is the national stage entry of International Application Serial No. PCT/US2021/064366, filed Dec. 20, 2021, entitled "SYSTEMS AND METHODS FOR SIMULTANEOUS MULTIPLE POINT OF VIEW VIDEO," which claims priority to and benefit of U.S. Provisional Application Ser. No. 63/127,419, entitled "SYSTEMS AND METHODS FOR SIMULTANEOUS MULTIPLE POINT OF VIEW VIDEO," which was filed on Dec. 18, 2020. All of the contents of the previously identified applications are hereby incorporated by reference for any purpose in their entirety.

FIELD

The present disclosure relates to video streaming tools, and in particular to video streaming tools for processing and integrating multiple simultaneous video streams.

BACKGROUND

Traditional video recording and streaming systems often offer only a single point of view for a given event. In traditional systems, multiple image streams may be synchronized based on contemporaneously recorded audio data. This this regard, traditional systems may introduce synchronization errors in response to audio quality issues, room dynamics, or other external factors.

SUMMARY

In various embodiments, systems, methods, and articles of manufacture (collectively, the "system") for simultaneous multiple point of view video are disclosed. The system may receive a first video stream from a first device, receive a second video stream from a second device, and receive a third video stream from a third device. The system may extract timing data from each of the first video stream, the second video stream, and the third video stream. The system may determine time signatures associated with each of the first video stream, the second video stream, and the third video stream based on the timing data. The system may generate a post-process data based on each of the first video stream, the second video stream, and the third video stream. The system may align one or more time signatures encoded on the post-process data to generate a production data file comprising a plurality of time synchronized video streams corresponding to each of the first video stream, the second video stream, and the third video stream.

In various embodiments, the system may perform an operation or manipulation of raw image data. In various embodiments, the system may enable active viewing via a mobile device of each of the first video stream, the second video stream, and the third video stream. In various embodiments, the system may enable selection and simultaneous display via a mobile device of each of the plurality of time synchronized video streams. In various embodiments, the timing data is WebRTC timing data. In various embodiments, the system may comprise a stream fusion module configured to synchronize and align data streams from a plurality of image sensors. In various embodiments, the system may comprise an application programming interface module, a data handler module, a video processing module, a user interface module, and a database module.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
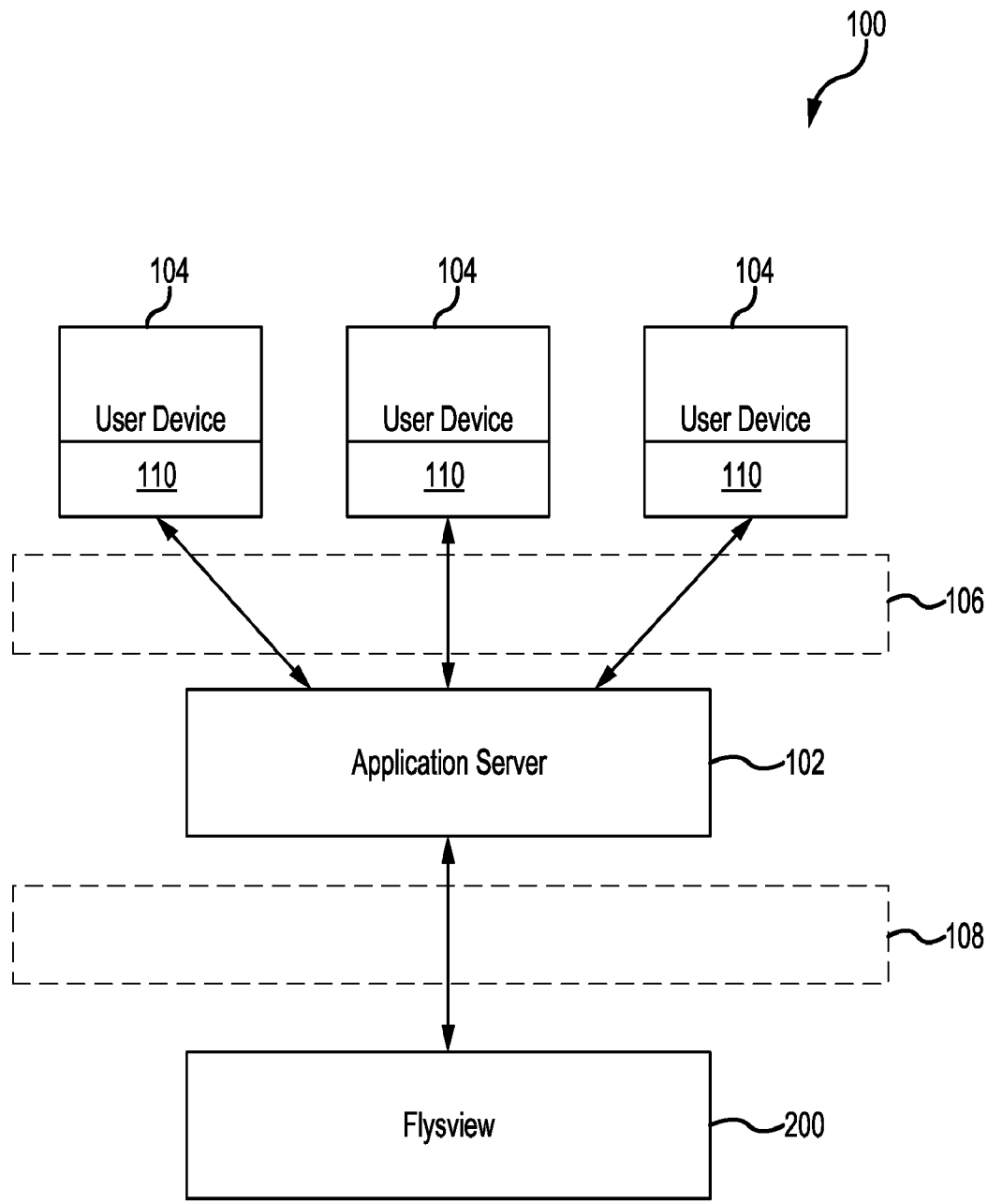
FIG. 1 is a block diagram illustrating various system components of a system for simultaneous multiple point of view video in accordance with various exemplary embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, and with reference to FIG. 1, a system 100 for simultaneous multiple point of view video synchronization is depicted. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 may comprise an application server 102, a user device 104, and a service 200. Any of these components may be outsourced and/or be in communication with the data comparator application server 102 and/or service 200 via a network such as, for example a first network 106 and a second network 108.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or Flysview service (i.e., service 200) may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the service 200 via the second network 108. In this regard, the application server 102 may allow communication from the user devices 104 to systems, engines, and components of system 100 (such as, for example, service 200). In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of data across networks (106, 108).

In various embodiments, a user device 104 may comprise software and/or hardware in communication with the system 100 via a network (e.g. network 106) comprising hardware and/or software configured to allow a user, and/or the like, access to the application server 102. The user device 104 may comprise any suitable device that is configured to allow a user to communicate with a network and the system 100. The user device may include, for example, a personal computer, personal digital assistant, cellular phone, kiosk, mobile device, and/or the like and may allow a user to transmit comparison requests to the system 100. In various embodiments, the user device 104 includes an image sensor and/or video recording device such as, for example, a charge-coupled device. In various embodiments, the user device 104 described herein may run a web application or native application to communicate with application server 102. A native application 110 may be installed on the user device 104 via download, physical media, or an app store, for example. The native application 110 may utilize the development code base provided for use with the operating system and capable of performing system calls to manipulate the stored and displayed data on the user device 104 and communicates with application server 102. A web application may be web browser compatible and written specifically to run on a web browser. The web application may thus be a browser-based application that operates in conjunction with application server 102.

In various embodiments, the native application 110 running on the user device 104 may be in communication with the application server 102 to support real-time updates. For example, data pertaining to the service 200 may synchronize across the various user devices 104 used by any number of users interacting with the application server 102 and/or service 200. In this regard, the application server 102 may serve data from service 200 to each of the user devices 104 and may serve commands from the user devices 104 to the service 200. In various embodiments, application server 102 may apply access permissions to restrict the data transmitted between the networks (106, 108) and/or the various components of system 100. Users may be authenticated on the native application 110, for example, via a user name, password, dual factor authentication, private cryptographic key, one-time password, security question, biometrics, or other suitable authentication techniques know to those skilled in the art.

Figure 2:
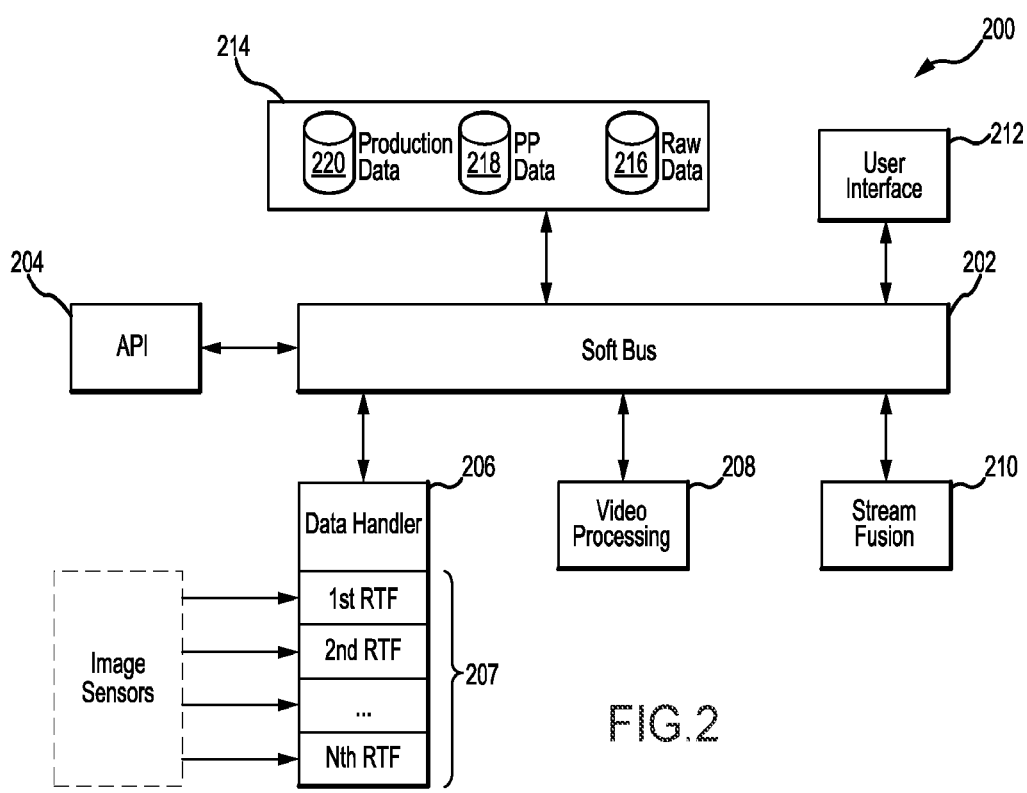
FIG. 2 is a block diagram illustrating a service of a system for simultaneous multiple point of view video in accordance with various exemplary embodiments.
Figure 3:
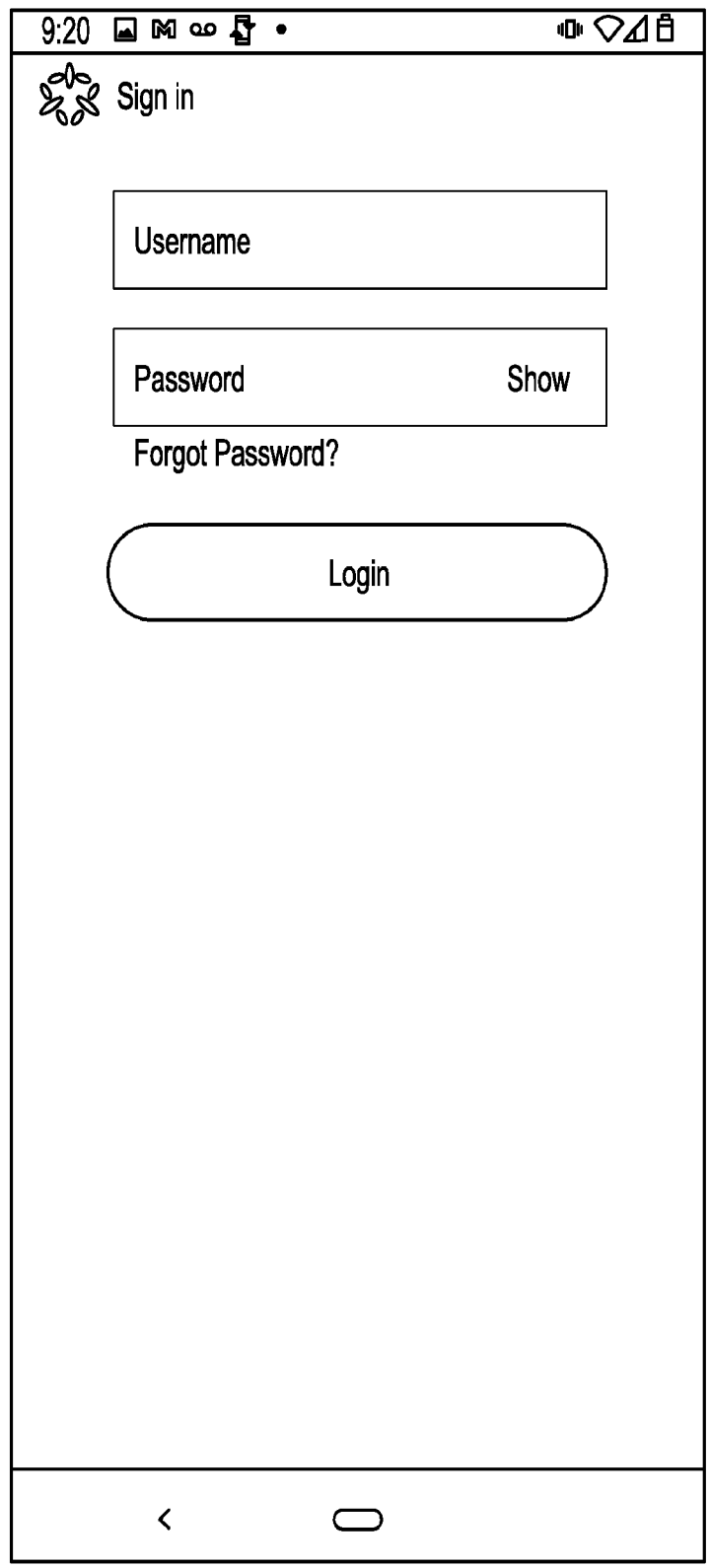
FIG. 3 is a sign in interface of a system for simultaneous multiple point of view video in accordance with various exemplary embodiments.
Figure 4:
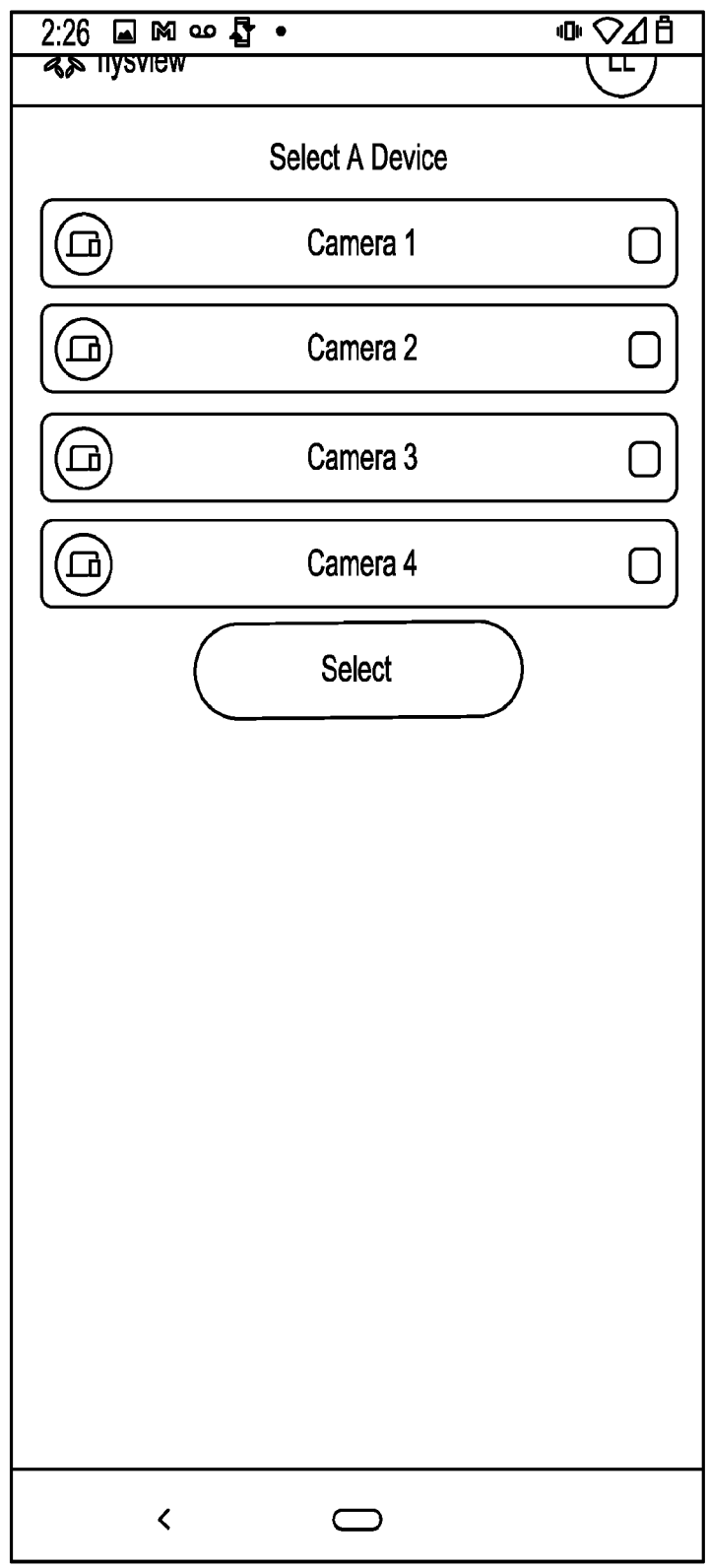
FIG. 4 is a device selection interface of a system for simultaneous multiple point of view video in accordance with various exemplary embodiments.
Figure 5:
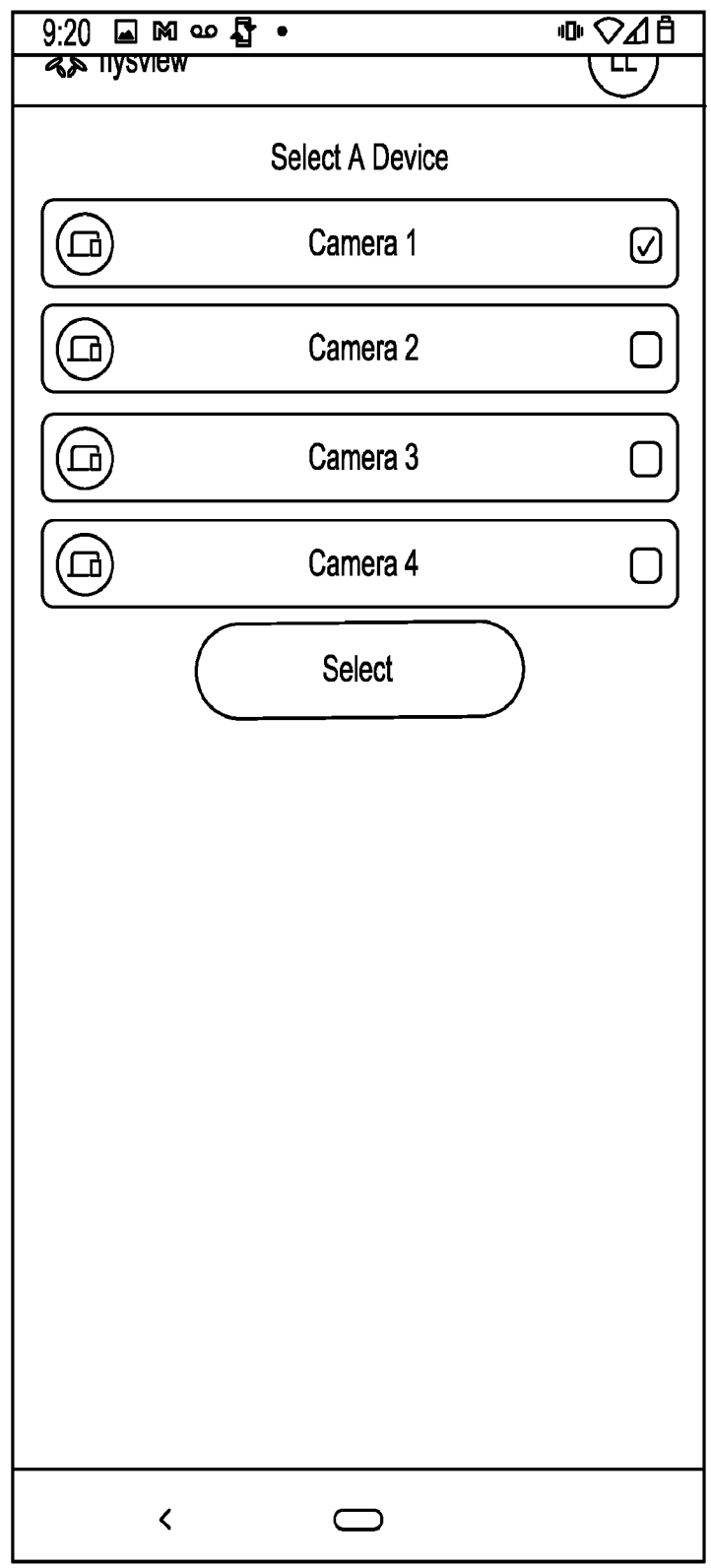
FIG. 5 is a device selection interface of a system for simultaneous multiple point of view video in accordance with various exemplary embodiments.
Figure 6:
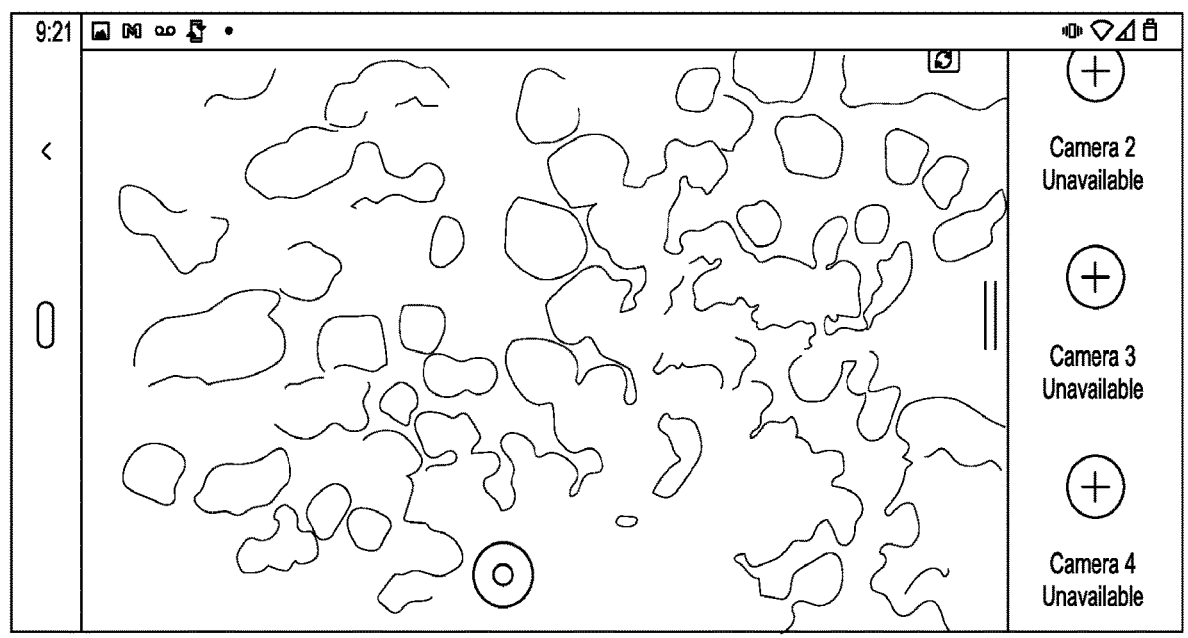
FIG. 6 is a recording interface of a system for simultaneous multiple point of view video in accordance with various exemplary embodiments.
Figure 7:
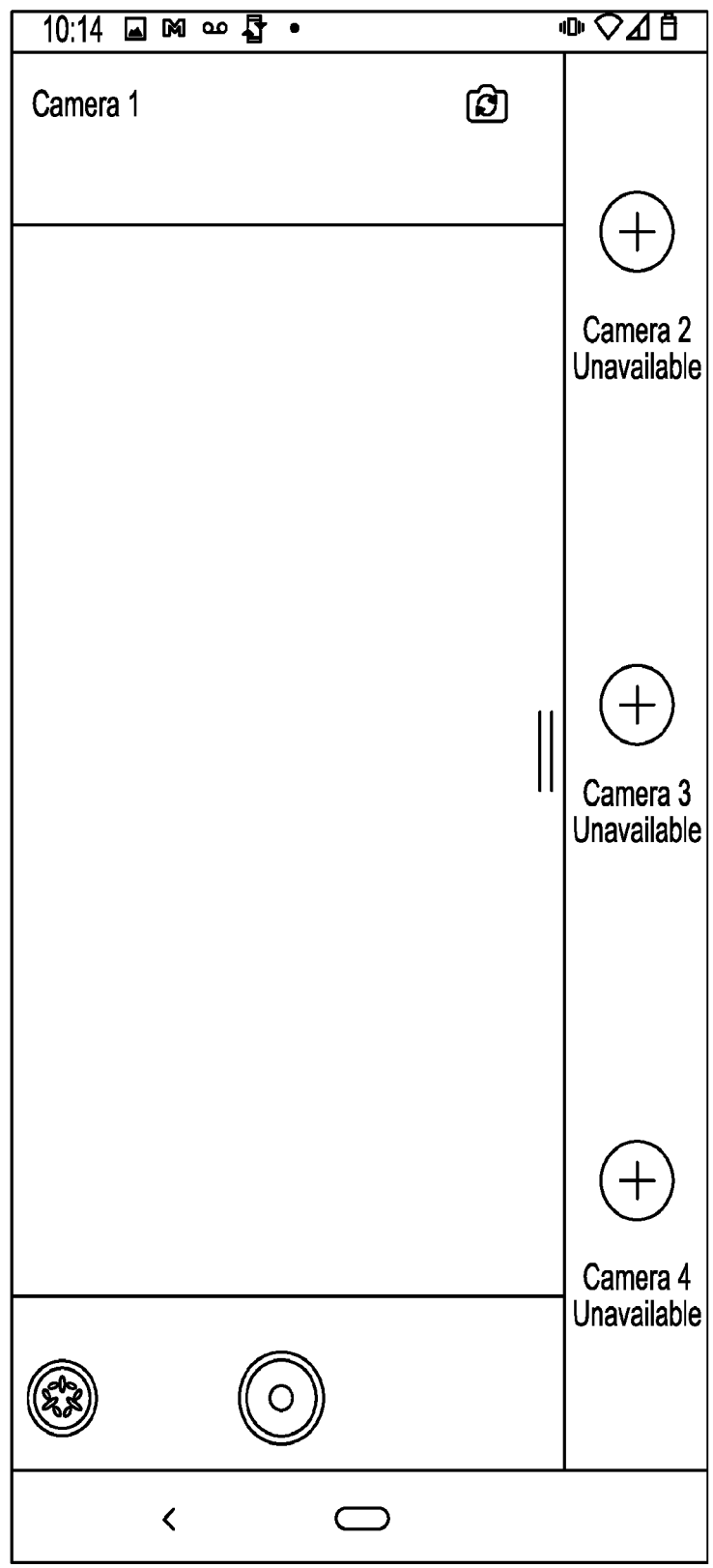
FIG. 7 is a recording interface of a system for simultaneous multiple point of view video in accordance with various exemplary embodiments
Figure 8:
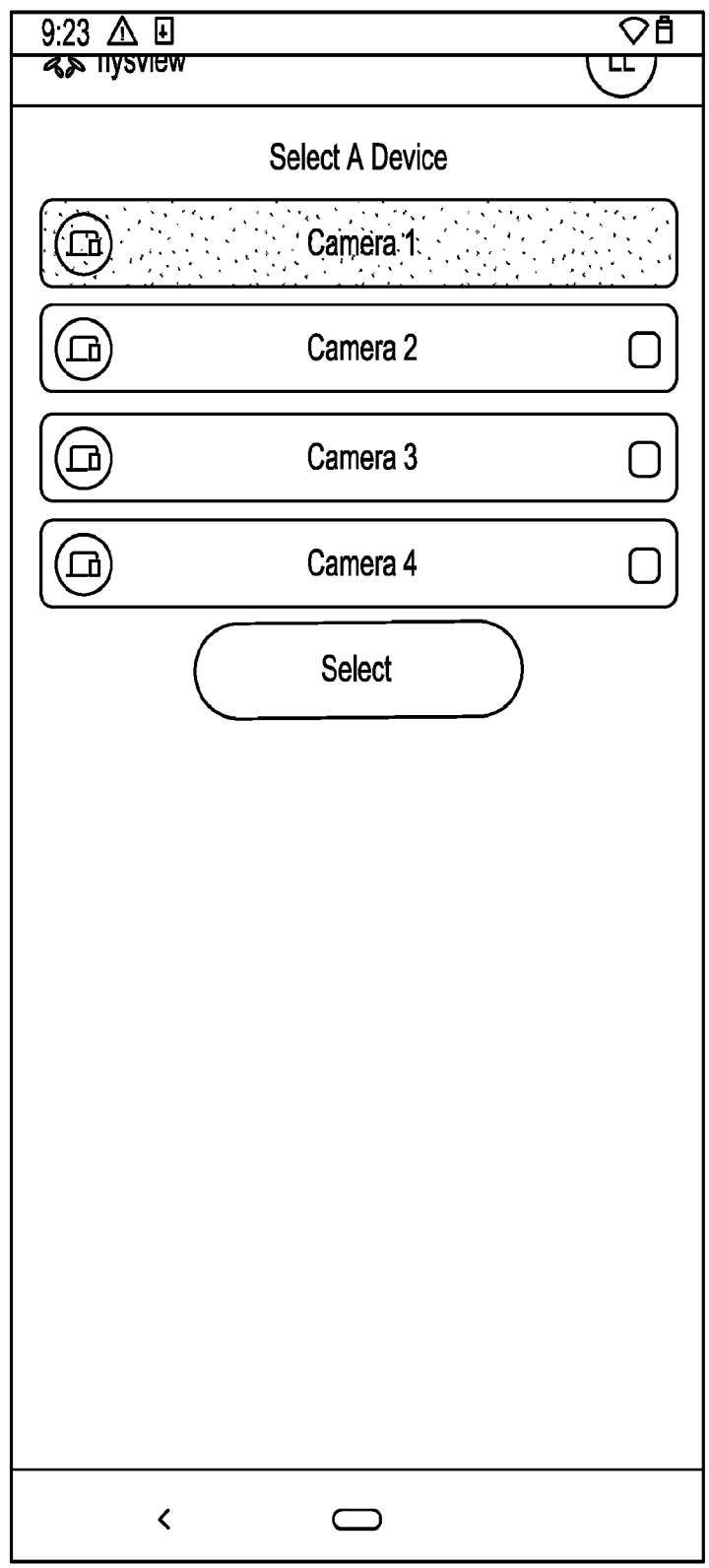
FIG. 8 is a device selection interface of a system for simultaneous multiple point of view video in accordance with various exemplary embodiments.
Figure 9:
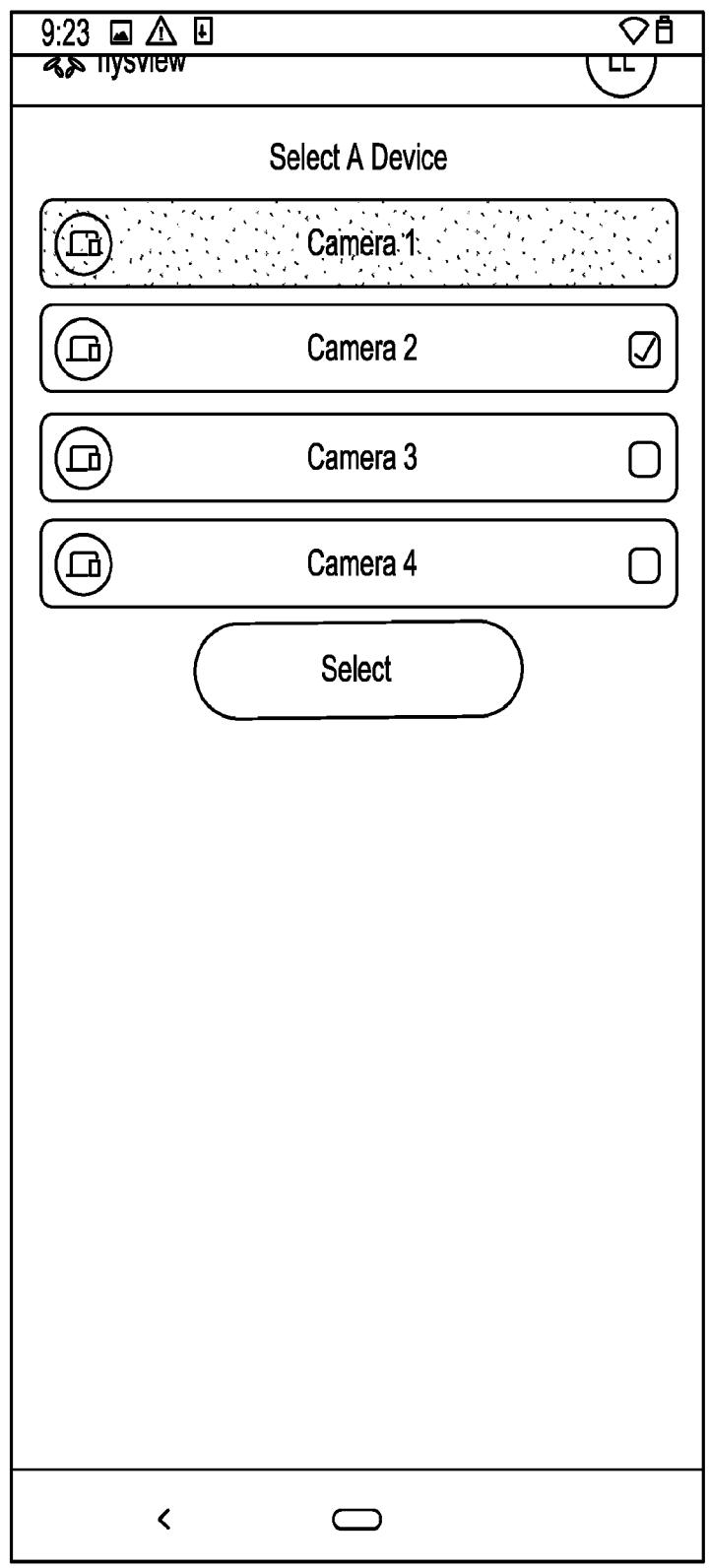
FIG. 9 is a device selection interface of a system for simultaneous multiple point of view video in accordance with various exemplary embodiments.
Figure 10:
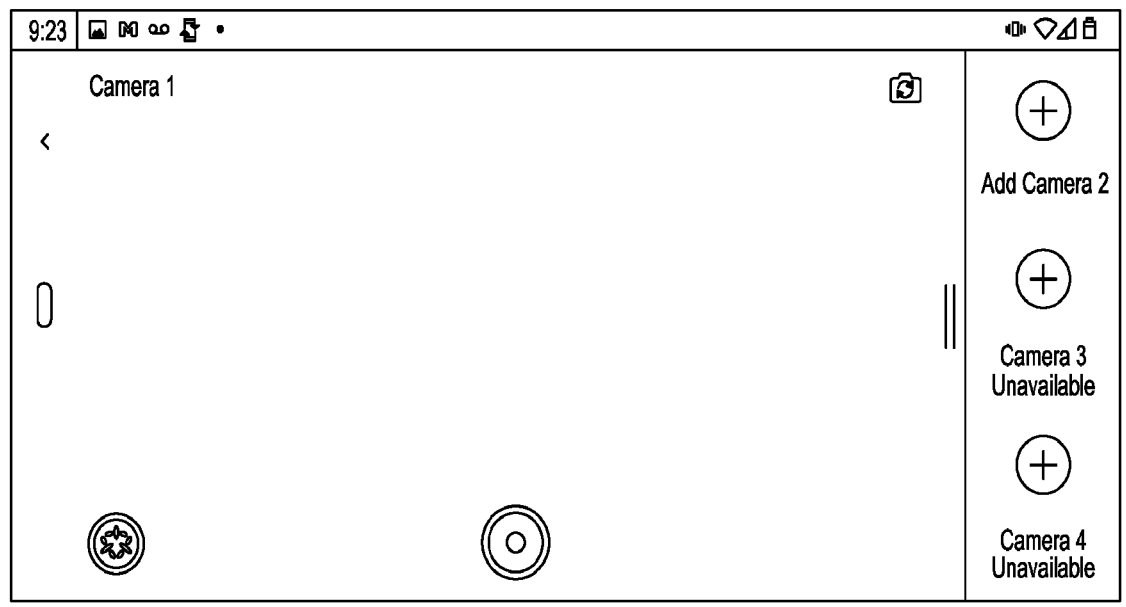
FIG. 10 is a recording interface of a system for simultaneous multiple point of view video in accordance with various exemplary embodiments.
Figure 11:
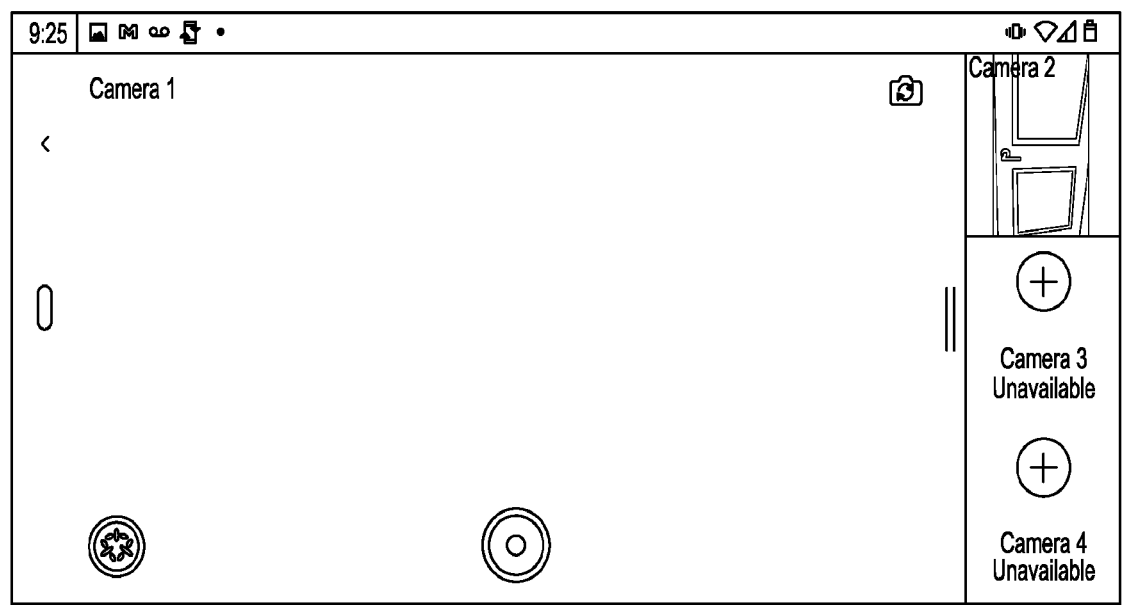
FIG. 11 is a recording interface of a system for simultaneous multiple point of view video in accordance with various exemplary embodiments.
Figure 12:
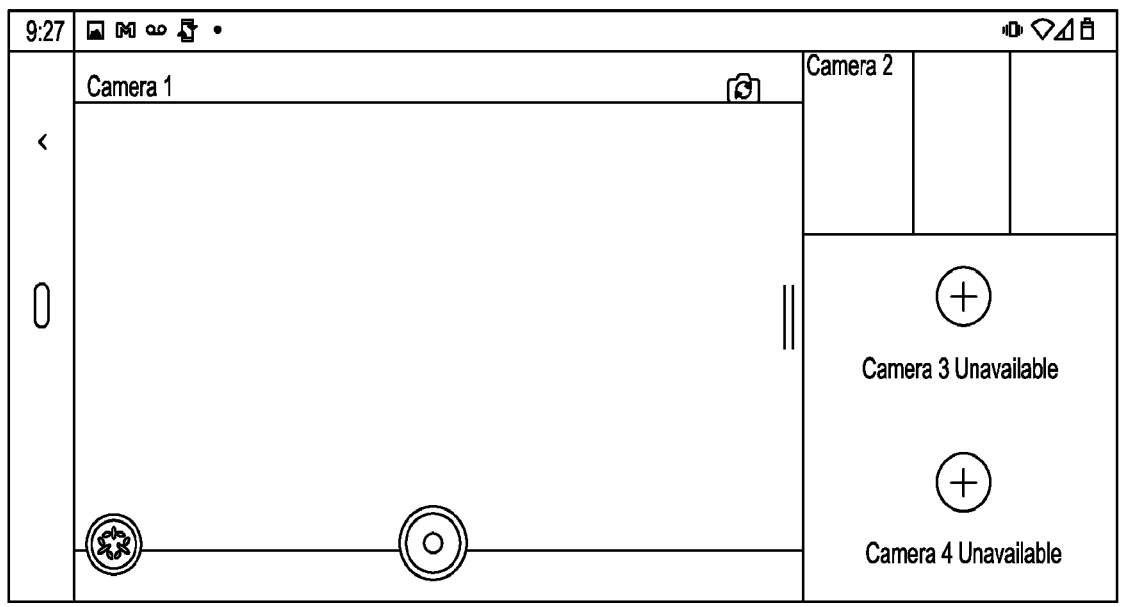
FIG. 12 is a recording interface of a system for simultaneous multiple point of view video in accordance with various exemplary embodiments.
Figure 13:
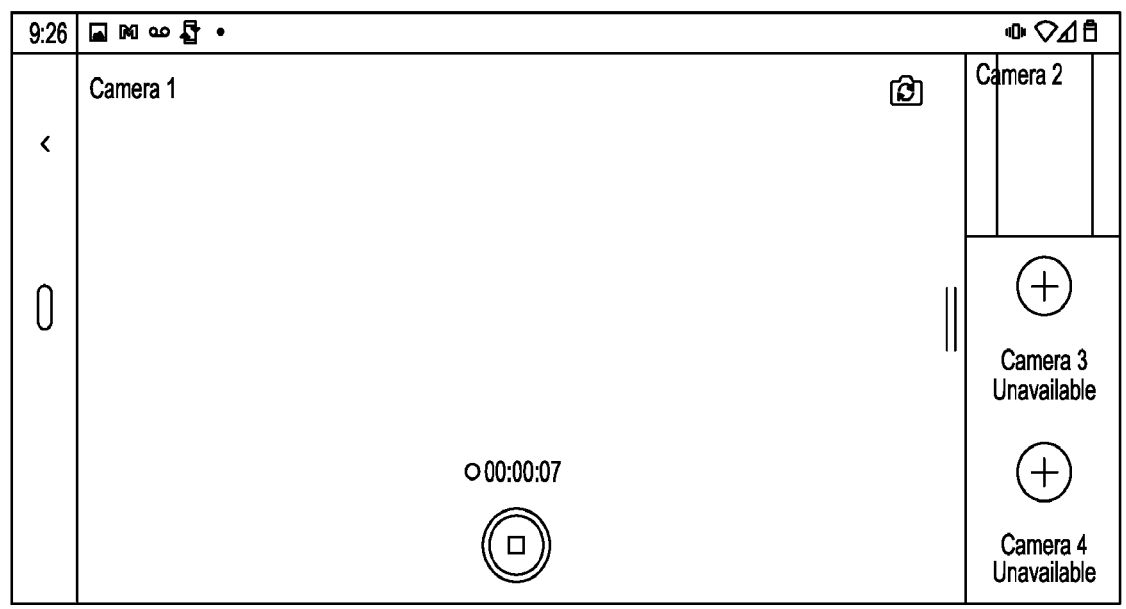
FIG. 13 is a recording interface of a system for simultaneous multiple point of view video in accordance with various exemplary embodiments.
Figure 14:
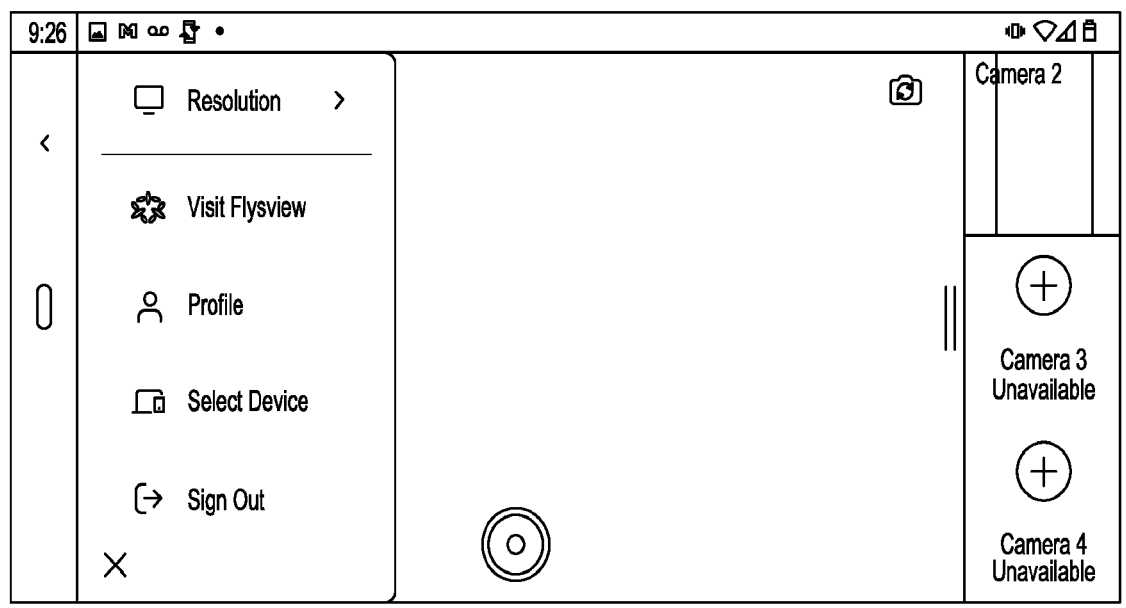
FIG. 14 is a settings interface of a system for simultaneous multiple point of view video in accordance with various exemplary embodiments.
Figure 15:
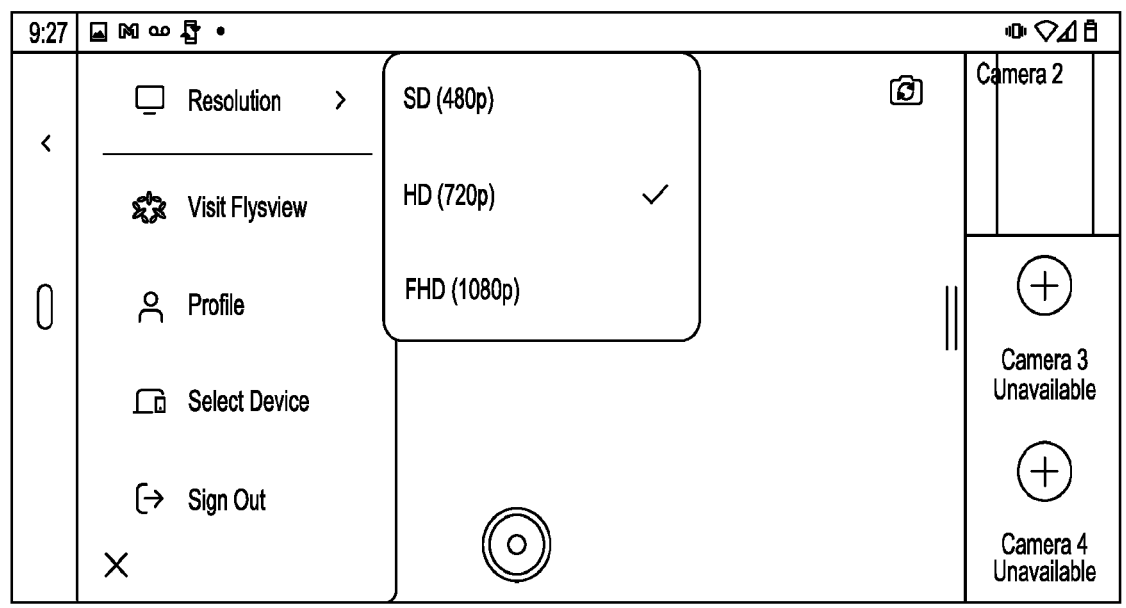
FIG. 15 is a settings interface of a system for simultaneous multiple point of view video in accordance with various exemplary embodiments.
Figure 16:
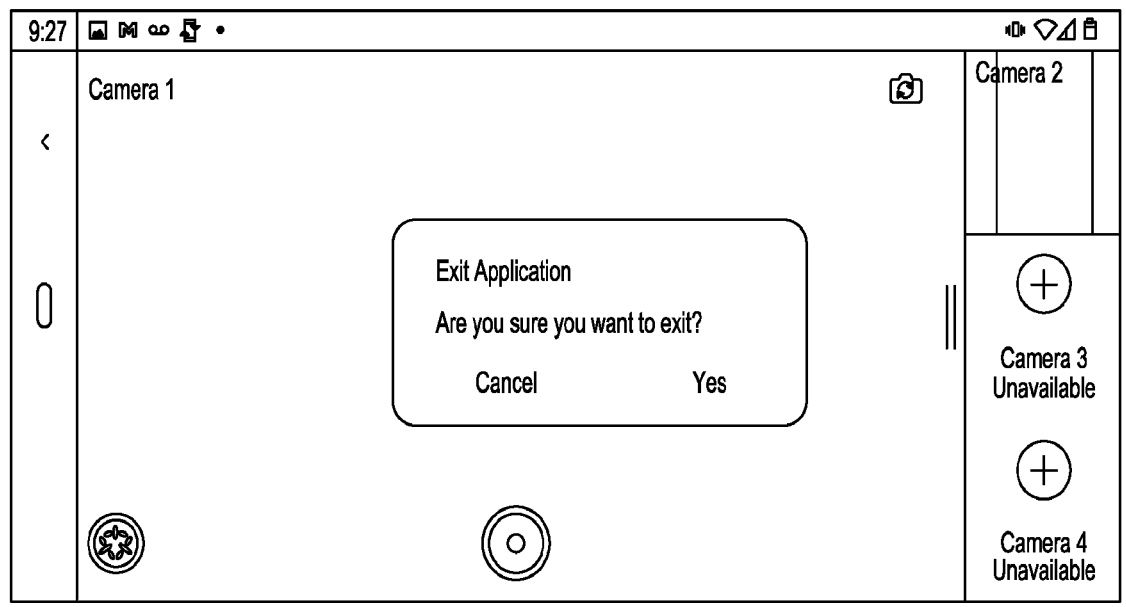
FIG. 16 is a sign out interface of a system for simultaneous multiple point of view video in accordance with various exemplary embodiments.
Figure 17:
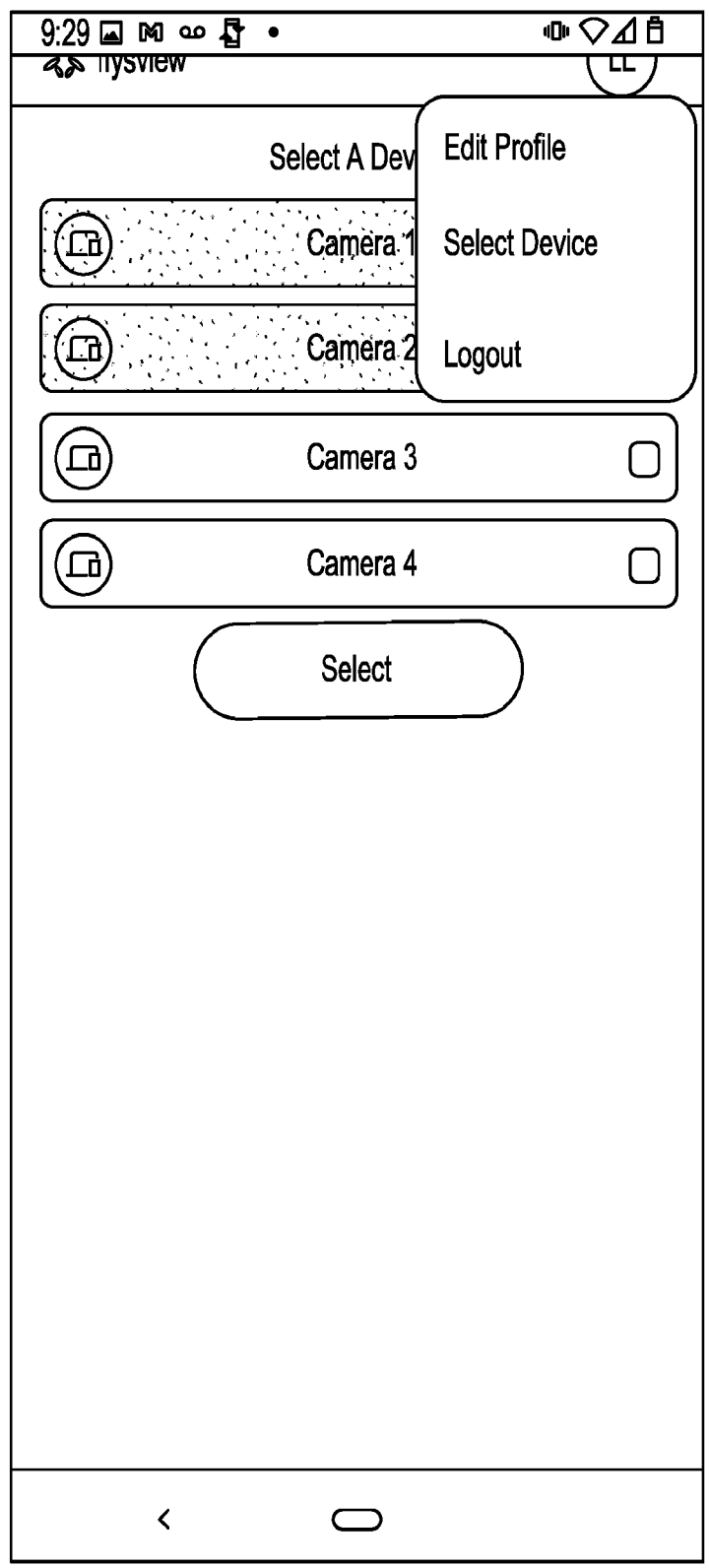
FIG. 17 is a profile interface of a system for simultaneous multiple point of view video in accordance with various exemplary embodiments.
Figure 18:
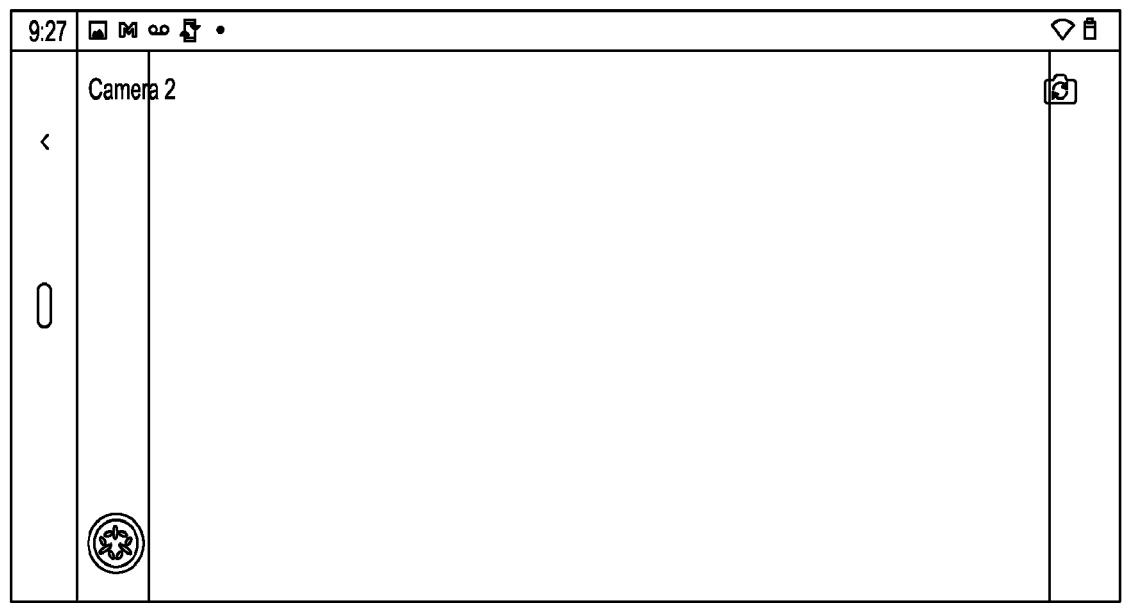
FIG. 18 is a viewing interface of a system for simultaneous multiple point of view video in accordance with various exemplary embodiments.
Figure 19:
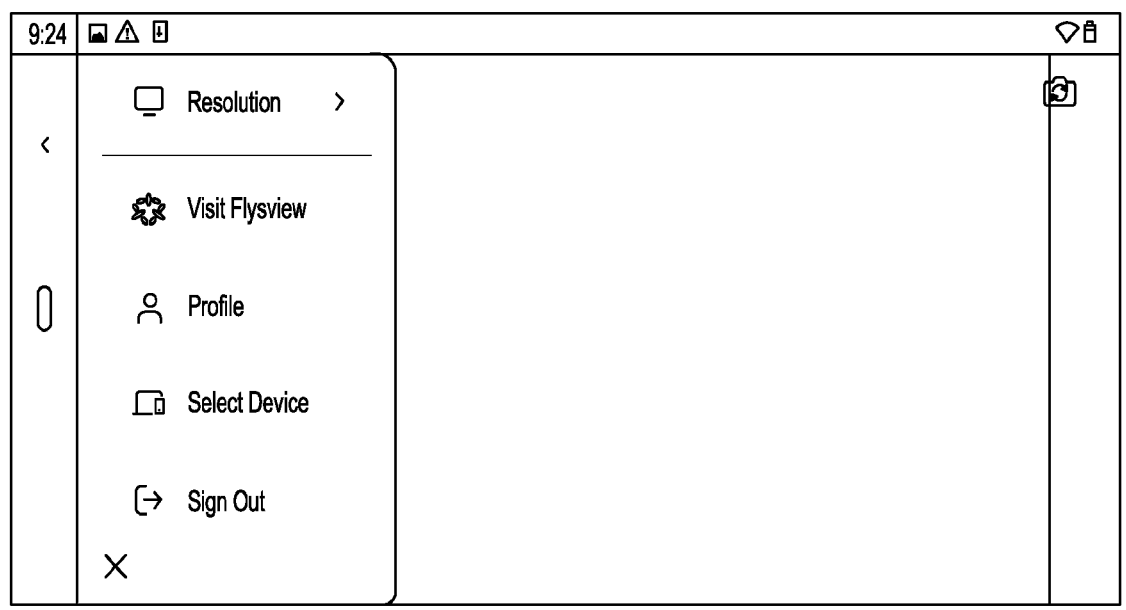
FIG. 19 is a settings interface of a system for simultaneous multiple point of view video in accordance with various exemplary embodiments.

With additional reference to FIG. 2, a block diagram of a service 200 of system 100 is illustrated in accordance with various embodiments. Service 200 may comprise a software bus architecture 202, an application programming interface (i.e., API module 204), a data handler 206 module, a video processing module 208, a stream fusion module 210, a user interface module 212, and a database module 214.

In various embodiments, API module 204 may be configured to provide a programmatic interface to any of the set of system 100 or service 200 services, components, modules, and/or engines.

In various embodiments the data handler 206 is configured to capture and process data from one more image sensors into a plurality of data feeds 207 for use by the various systems, engines, and components of service 200. In various embodiments, the data feeds 207 may be real-time data feeds such as, for example, video streams. The data handler may be capable of integrating with a variety of data sources. The data handler may extract raw timing data from the data feeds.

In various embodiments, the video processing module 208 may be configured to collect and process data from the data handler 206. The video processing module 208 may receive the raw image data 216 and perform various operations and manipulations of the raw image data 216. The video processing module 208 may generate post-process data (PP Data 218) for later use by the stream fusion module 210.

In various embodiments, the stream fusion module 210 comprises engines configured to synchronize and align the streams from the image sensors of the various user devices. The stream fusion module 210 may align one or more time signatures encoded in the PP Data 218 to generate a production data 220 file comprising a plurality of time synchronized video streams corresponding to each of the raw data feeds. In various embodiments, the stream fusion module 210 may generate the production data based on WebRTC timing data extracted by the data handler 206.

In various embodiments, the user interface module 212 may provide outputs from the service 200 to the user devices 104. In various embodiments, the user interface module 212 may provide outputs through two channels such as, for example, a web based application or the native application 110. The user interface may enable active viewing of real time streams from the image sensors. The user interface may enable on demand viewing of archived production data 220. The user interface may enable selection and simultaneous display of one or more of the synchronized video streams.

In various embodiments, the database module 214 may include any number of data structures or data elements such as, for example, raw data 216, PP data 218, and production data 220. Database module 214 may be configured to maintain raw data 216 such as, for example, streaming data from the image sensors. Database module 214 may be configured to maintain PP data 218 such, for example, data extracted by the data handler 207 which has been processed via the video processing module 208. Database module 214 may be configured to maintain production data 220 such as, for example, as generated via the stream fusion module 210.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

The disclosure and claims do not describe only a particular outcome of a system for failure detection tools, but the disclosure and claims include specific rules for implementing the outcome of a system for failure detection tools and that render information into a specific format that is then used and applied to create the desired results of a system for failure detection tools, as set forth in *McRO. Inc. v. Bandai Namco Games America Inc*. (Fed. Cir. case number 15-1080, Sep. 13, 2016). In other words, the outcome of a system for failure detection tools can be performed by many different types of rules and combinations of rules, and this disclosure includes various embodiments with specific rules. While the absence of complete preemption may not guarantee that a claim is eligible, the disclosure does not sufficiently preempt the field of a system for failure detection tools at all. The disclosure acts to narrow, confine, and otherwise tie down the disclosure so as not to cover the general abstract idea of just a system for failure detection tools. Significantly, other systems and methods exist for a system for failure detection tools, so it would be inappropriate to assert that the claimed invention preempts the field or monopolizes the basic tools of a system for failure detection tools. In other words, the disclosure will not prevent others from a system for failure detection tools, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

What is claimed is:

1. A computer based system comprising:
  a processor;
  a tangible, non-transitory memory configured to communicate with the processor, the tangible, non-transitory memory having instructions stored thereon that, in response to execution by the processor, cause the processor to perform operations comprising:
    authenticating, by the processor and on a native application, a user account on a first device, a second device, and a third device;
    receiving, by the processor, a first real-time video stream captured using the native application running on the first device;
    receiving, by the processor, a second real-time video stream captured using the native application running on the second device;
    receiving, by the processor, a third real-time video stream captured using the native application running on the third device;
    extracting, by the processor, timing data from each of the first real-time video stream, the second real-time video stream, and the third real-time video stream;
    determining, by the processor, time signatures associated with each of the first real-time video stream, the second real-time video stream, and the third real-time video stream based on the timing data;
    generating, by the processor, a post-process data based on each of the first real-time video stream, the second real-time video stream, and the third real-time video stream;
    aligning, by the processor, one or more time signatures encoded on the post-process data to generate a production data file comprising a plurality of time synchronized video streams corresponding to each of the first real-time video stream, the second real-time video stream, and the third real-time video stream;
    receiving, at the processor, a selection of the first real-time video stream from a GUI associated with a user device;
    coordinating displaying, by the processor, the first real-time video stream on the GUI associated with the user device;
    receiving, at the processor, a selection of the second real-time video stream from the GUI associated with the user device; and
    coordinating displaying, by the processor, the second real-time video stream on the GUI associated with the user device simultaneously with the first real-time video stream, wherein the first real-time video stream and the second real-time video stream are displayed on both the native application and a web application.

2. The system of claim 1, wherein the operations further comprise performing, by the processor, an operation or manipulation of raw image data.

3. The system of claim 1, wherein the operations further comprise enabling, by the processor, active viewing via a mobile device of each of the first real-time video stream, the second real-time video stream, and the third real-time video stream.

4. The system of claim 1, wherein the operations further comprise enabling, by the processor, selection and simultaneous display via a mobile device of each of the plurality of time synchronized video streams.

5. The system of claim 1, wherein the timing data is WebRTC timing data.

6. The system of claim 1 further comprising a stream fusion module configured to synchronize and align data streams from a plurality of image sensors.

7. The system of claim 6, further comprising an application programming interface module, a data handler module, a video processing module, a user interface module, and a database module.

8. A method comprising:
  authenticating, by a computer based system and on a native application, a user account on a first device, a second device, and a third device;
  receiving, by the computer based system, a first real-time video stream captured using the native application running on the first device;
  receiving, by the computer based system, a second real-time video stream captured using the native application running on the second device;
  receiving, by the computer based system, a third real-time video stream captured using the native application running on the third device;
  extracting, by the computer based system, timing data from each of the first real-time video stream, the second real-time video stream, and the third real-time video stream;
  determining, by the computer based system, time signatures associated with each of the first real-time video stream, the second real-time video stream, and the third real-time video stream based on the timing data;
  generating, by the computer based system, a post-process data based on each of the first real-time video stream, the second real-time video stream, and the third real-time video stream;
  aligning, by the computer based system, one or more time signatures encoded on the post-process data to generate a production data file comprising a plurality of time synchronized video streams corresponding to each of the first real-time video stream, the second real-time video stream, and the third real-time video stream;
  receiving, at the computer based system, a selection of the first real-time video stream from a GUI associated with a user device;
  coordinating displaying, by the computer based system, the first real-time video stream on the GUI associated with the user device;
  receiving, at the computer based system, a selection of the second real-time video stream from the GUI associated with the user device; and
  coordinating displaying, by the computer based system, the second real-time video stream on the GUI associated with the user device simultaneously with the first real-time video stream, wherein the first real-time video stream and the second real-time video stream are displayed on both the native application and a web application.

9. The method of claim 8 further comprising performing, by the computer based system, an operation or manipulation of raw image data.

10. The method of claim 8 further comprising enabling, by the computer based system, active viewing via a mobile device of each of the first real-time video stream, the second real-time video stream, and the third real-time video stream.

11. The method of claim 8 further comprising enabling, by the computer based system, selection and simultaneous display via a mobile device of each of the plurality of time synchronized video streams.

12. The method of claim 8, wherein the timing data is WebRTC timing data.

13. The method of claim 8 further comprising configuring a stream fusion module to synchronize and align data streams from a plurality of image sensors.

14. An article of manufacture including a non-transitory, tangible computer readable storage medium having instructions stored thereon that, in response to execution by a computer based system, cause the computer based system to perform operations comprising:
- authenticating, by the computer based system and on a native application, a user account on a first device, a second device, and a third device;
- receiving, by the computer based system, a first real-time video stream captured using the native application running on the first device;
- receiving, by the computer based system, a second real-time video stream captured using the native application running on the second device;
- receiving, by the computer based system, a third real-time video stream captured using the native application running on the third device;
- extracting, by the computer based system, timing data from each of the first real-time video stream, the second real-time video stream, and the third real-time video stream;
- determining, by the computer based system, time signatures associated with each of the first real-time video stream, the second real-time video stream, and the third real-time video stream based on the timing data;
- generating, by the computer based system, a post-process data based on each of the first real-time video stream, the second real-time video stream, and the third real-time video stream;
- aligning, by the computer based system, one or more time signatures encoded on the post-process data to generate a production data file comprising a plurality of time synchronized video streams corresponding to each of the first real-time video stream, the second real-time video stream, and the third real-time video stream;
- receiving, at the computer based system, a selection of the first real-time video stream from a GUI associated with a user device;
- coordinating displaying, by the computer based system, the first real-time video stream on the GUI associated with the user device;
- receiving, at the computer based system, a selection of the second real-time video stream from the GUI associated with the user device; and
- coordinating displaying, by the computer based system, the second real-time video stream on the GUI associated with the user device simultaneously with the first real-time video stream, wherein the first real-time video stream and the second real-time video stream are displayed on both the native application and a web application.

15. The article of manufacture of claim 14, wherein the operations further comprise performing, by the computer based system, an operation or manipulation of raw image data.

16. The article of manufacture of claim 14, wherein the operations further comprise enabling, by the computer based system, active viewing via a mobile device of each of the first real-time video stream, the second real-time video stream, and the third real-time video stream.

17. The article of manufacture of claim 14, wherein the operations further comprise enabling, by the computer based system, selection and simultaneous display via a mobile device of each of the plurality of time synchronized video streams.

18. The article of manufacture of claim 14, wherein the timing data is WebRTC timing data.

19. The article of manufacture of claim 14 further comprising a stream fusion module configured to synchronize and align data streams from a plurality of image sensors.

20. The article of manufacture of claim 19, further comprising an application programming interface module, a data handler module, a video processing module, a user interface module, and a database module.

* * * * *